US011475058B1

(12) United States Patent
Gupta et al.

(10) Patent No.: US 11,475,058 B1
(45) Date of Patent: Oct. 18, 2022

(54) SYSTEMS AND METHODS FOR GENERATING A DYNAMIC TIMELINE OF RELATED MEDIA CONTENT BASED ON TAGGED CONTENT

(71) Applicant: Rovi Guides, Inc., San Jose, CA (US)

(72) Inventors: Vikram Makam Gupta, Karnataka (IN); Vishwas Sharadanagar Panchaksharaiah, Tumkur District (IN); Cato Yang, San Jose, CA (US); Reda Harb, Bellevue, WA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/504,802

(22) Filed: Oct. 19, 2021

(51) Int. Cl.
| | |
|---|---|
| *G06F 16/44* | (2019.01) |
| *G06F 3/0482* | (2013.01) |
| *G06F 3/0485* | (2022.01) |
| *G06F 40/279* | (2020.01) |
| *G06F 16/438* | (2019.01) |
| *G06F 40/134* | (2020.01) |
| *H04N 21/482* | (2011.01) |

(52) U.S. Cl.
CPC .......... *G06F 16/447* (2019.01); *G06F 3/0482* (2013.01); *G06F 3/0485* (2013.01); *G06F 16/438* (2019.01); *G06F 40/134* (2020.01); *G06F 40/279* (2020.01); *H04N 21/4826* (2013.01)

(58) Field of Classification Search
CPC ... G06F 16/438; G06F 16/447; H04N 21/482; H04N 21/4825; H04N 21/4826; H04N 21/4828
See application file for complete search history.

(56) References Cited

U.S. PATENT DOCUMENTS

| | | | |
|---|---|---|---|
| 10,701,450 B2* | 6/2020 | Selvaraj | H04N 21/4823 |
| 2010/0262618 A1* | 10/2010 | Hedinsson | G06F 16/4387 |
| | | | 707/E17.001 |
| 2011/0119621 A1* | 5/2011 | Cho | H04N 21/4316 |
| | | | 715/788 |
| 2014/0337346 A1* | 11/2014 | Barthel | G06F 16/22 |
| | | | 707/738 |
| 2016/0134941 A1* | 5/2016 | Selvaraj | H04N 21/8549 |
| | | | 725/40 |
| 2016/0142787 A1* | 5/2016 | Mohamed | H04N 21/4828 |
| | | | 725/53 |
| 2016/0170582 A1* | 6/2016 | Nag | G06F 16/43 |
| | | | 715/716 |
| 2016/0371257 A1* | 12/2016 | Nishimura | H04N 21/4826 |
| 2017/0068423 A1* | 3/2017 | Napolitano | G06F 16/45 |
| 2018/0113579 A1* | 4/2018 | Johnston | G06F 3/0485 |
| 2018/0310051 A1* | 10/2018 | Zabetian | H04N 21/4788 |

* cited by examiner

*Primary Examiner* — Asher D Kells
(74) *Attorney, Agent, or Firm* — Haley Guiliano LLP

(57) ABSTRACT

Systems and methods are described herein for generating a timeline of media assets on a media guidance application that dynamically adjusts the timeline of related media assets associated with the media asset selected by a user, by comparing keywords. In another embodiment, the systems and methods are described for masking portions of headline of the media asset for increasing interests in selecting the media asset.

20 Claims, 10 Drawing Sheets

200A

⊟ Top Stories — 203    201

THE TIMES OF INDIA
RR vs SRH Live Score, IPL 2021: Jos Buttler maiden ton powers Rajasthan Royals to...
9 mins ago

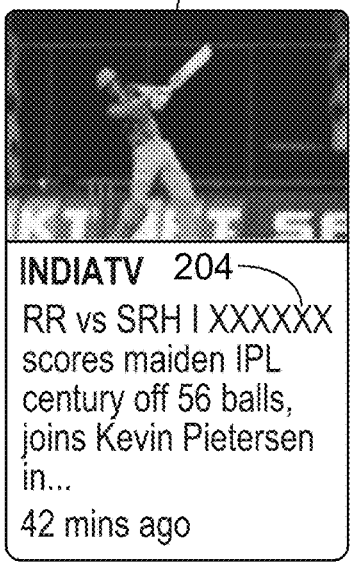
INDIATV  204
RR vs SRH I XXXXXX scores maiden IPL century off 56 balls, joins Kevin Pietersen in...
42 mins ago

india.com
Live Score RR vs SRH IPL 2021 Match Updates: Centurion Buttler Powers...
29 mins ago

⊟ Top Stories — 253    251

THE TIMES OF INDIA
RR vs SRH Live Score, IPL 2021: Jos Buttler maiden ton powers Rajasthan Royals to...
9 mins ago

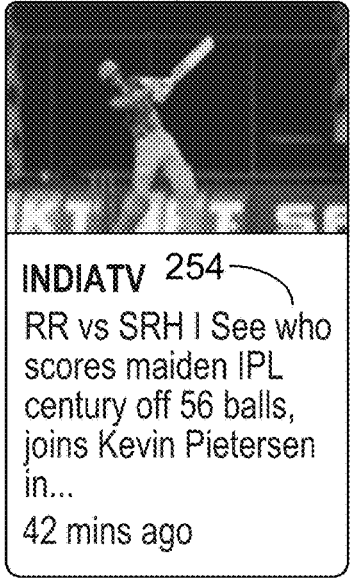
INDIATV  254
RR vs SRH I See who scores maiden IPL century off 56 balls, joins Kevin Pietersen in...
42 mins ago

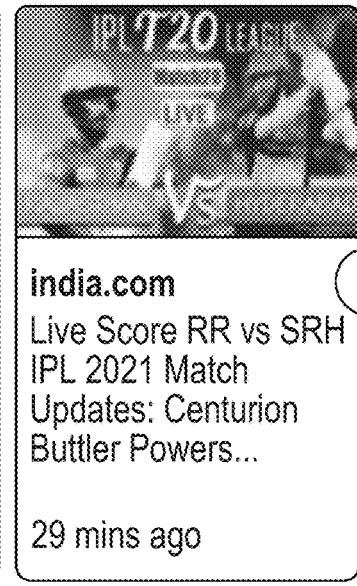
india.com
Live Score RR vs SRH IPL 2021 Match Updates: Centurion Buttler Powers...
29 mins ago

FIG. 2B

SYSTEMS AND METHODS FOR GENERATING A DYNAMIC TIMELINE OF RELATED MEDIA CONTENT BASED ON TAGGED CONTENT

BACKGROUND

The present disclosure relates to methods and systems for aggregating related content and, more particularly, to methods and systems for generating a dynamic timeline of related media content based on identifier tags. In another example, the present disclosure is directed to methods and systems for masking portions of headlines media content based on user preferences.

SUMMARY

The amount of media available to users in any given media delivery system can be substantial. Users simply have no time to consume all available media from all available sources in order to consume the specific content of their choosing. For example, a search for a football game may generate a large amount of content, requiring the user to sift through and access each content manually to find out if it is the content they want. Moreover, if users wish to consume additional content (e.g., a news broadcast on a particular topic) pertaining to the first content selected, the users must manually return to the search and select additional content. In particular, a user may be interested in a portion of content and may desire to view only content specifically associated with the portion (e.g., news updates or previous developments on the particular news topic) at a convenient time. Consequently, many users desire a form of media guidance through an interface that allows users to tag content and efficiently navigate media selections related to the tagged content.

In another scenario, users may read the heading or title of an article or publication and already know the content of the publication. The headline may be very descriptive and reveal the summary of the entire news article. Although many publishers use clever and enticing headings, once a news article is published, its content is rarely changed except if the author makes a correction, usually of a typo or a fact (the latter mainly done with articles about politics). Accordingly, the user may skip the news article, which reduces click-through on links to additional digital content. Consequently, many publishers desire a form of media content that may be modified dynamically to each user to increase their interest in selecting the media asset.

Accordingly, systems and methods are disclosed herein for a media guidance application (e.g., implemented on a user device) that dynamically generates a timeline of related media content based on content selected by a user. For example, a user may select a news story while viewing a news channel, to receive updates about the news story. The media guidance application may determine keywords that represent the news story selected by the user and search for news updates matching the keywords. The media guidance application may also search for past news stories associated with the news story selected by the user, to ultimately generate an intuitive user interface (e.g., timeline) that allows the user to access content associated with the user's selection. Generating the dynamic timeline of media content associated with user-selected content allows users to view the specific content of their choosing without manually selecting each of the content items from all available sources. Moreover, as the media guidance application generates the timeline of related content (e.g., news updates and summaries) from different content sources (e.g., news publications), users no longer need to manually sift through all media contents identified until the specific portion that they wish to view is shown. Similarly, users no longer need to manually search for and select older news segments of content (e.g., past news reports) associated with the particular topic of interest, as they would be curated on the dynamic timeline for easy access.

Further, systems and methods are disclosed herein for a media guidance application (e.g., implemented on a user device) that dynamically modifies the heading of a media content item based on user preferences. For example, a user is interested in a news story and wishes to receive updates about the news story. The media guidance application may determine at least one or more elements that represent a news story presented for the user and designate at least one or more elements in the portion of the media asset for enhancement. For example, the user may be a fan of a sports team, but the heading of a media asset may include descriptive language that, if consumed by the user, may result in the user not selecting the media asset. Therefore, in this example, the media guidance application may identify the heading of the media asset as an element designated for enhancement and may enhance the heading element by replacing or omitting it.

Consider a situation in which a user is viewing a news report about an athlete on a sports team. Based on his/her interest, the user may choose to tag the story via the media guidance application. The media guidance application may thus receive a first user selection of a media asset. The media content item may be a news article about the athlete's recent game performance. The media guidance application may also receive a selection of an option representing a type of information update related to the media asset. For example, the media guidance application may receive an option such as past game performance or trending stories involving the athlete. This type of information update may represent an aspect of the story that the user is interested in (e.g., trending stories may deal with the overall composure of the athlete).

In some embodiments, the media guidance application may extract a first plurality of keywords associated with the media asset, corresponding to the type of information update. For example, the first plurality of keywords may be extracted by the media guidance application from the metadata of the media asset, e.g., title, headline of news story, subtitles, audio, and text that appears on the screen. The keywords may include "Russell," "Russell Wilson," "quarterback," "Seahawks," "Week 3 results," etc. The media guidance application may extract a second plurality of keywords from the supplemental media asset. These keywords may also include "Russell," "Russell Wilson," "quarterback," "Seahawks," and "Week 3 results." The second plurality of keywords may include some of the first plurality of keywords. In this example, the media guidance application may determine that "Russell," "Russell Wilson," "quarterback," "Seahawks," and "Week 3 results" appear in both pluralities of keywords, or the second plurality may include other keywords from a similar context (e.g., results for a team).

The media guidance application may also search for past news stories associated with the news story selected by the user, to ultimately generate an intuitive user interface (e.g., timeline) that allows the user to access content associated with the user's selection. Generating the dynamic timeline of media assets and supplemental media assets associated with user tagged content allows users to view the specific content of their choosing without having to perform additional searches from all available sources. Moreover, as the media guidance application aggregates portions of related content (e.g., news updates and summaries) from different content sources (e.g., news channels), users no longer need to sift through an entire media asset until the specific portion that they wish to view is shown. Likewise, users no longer need to manually search for old portions of content (e.g., past news reports) associated with the particular topic of interest.

In response to determining that an amount of the first plurality of keywords included in the second plurality of keywords is less than a threshold, the media guidance application may store the second media asset, wherein the threshold represents media asset with common subject matter updated with new information. The threshold may be a quantitative or qualitative value that is used to determine whether the supplemental media asset offers new information or is too similar to the first media asset. For example, the media guidance application may set the threshold to be a percentage of similar keywords (e.g., 40%). Upon determining that the supplemental media asset has common subject matter, the media guidance application may note that out of 10 unique words, the two pluralities share five keywords (e.g., 50%). The media guidance application may determine that this value is greater than the threshold. Thus, the media guidance application may add the supplemental media asset to the timeline.

In some aspects, the media guidance application may receive a user selection of a media asset. Suppose that the user is viewing a news report on CNN News about Hurricane Ida hitting New Jersey. The media guidance application may allow the user to tag the story. Based on his/her interest, the user may end up tagging the story. The media guidance application may receive these selections associated with the media asset (e.g., flooding associated with Hurricane Ida).

In some embodiments, a system for generating a dynamic timeline for the selection of media content is disclosed. The method includes receiving, from a user device, a selection of a media asset for display on the user device. For example, a user selects a news article (e.g., published media asset) about an athlete or a recent football game. The system then accesses user preferences associated with a user profile associated with the user device. The system retrieves metadata associated with the media asset. The metadata includes one or more identifier tags of segments of the media asset and a date of the media asset. The system identifies a plurality of supplemental media assets. Each supplemental media asset of the plurality of supplemental media assets includes one or more identifier tags and a date of the supplemental media asset. The system generates, for presentation on the user device, the media asset and an interactive timeline.

In some embodiments, the interactive timeline includes a plurality of selectable links, with each selectable link associated with a supplemental media asset of the plurality of supplemental media assets. The plurality of selectable links are organized based on date. In some embodiments, the plurality of selectable links are organized based on relevance or any other preferred sequence. In some embodiments, the interactive timeline of the plurality of selectable links is scrollable. In some embodiments, the interactive timeline of selectable links includes a layered interactive timeline. The layered interactive timeline includes a first layer of a first plurality of supplemental media assets configured for a first identifier tag, and a second layer of a second plurality of supplemental media assets configured for a second identifier tag.

In some embodiments, the system receives a selection of a selectable link of the plurality of selectable links from the interactive timeline. The system then retrieves the supplemental media asset of the plurality of supplemental media assets for presentation on the user device. The selectable link is an automatic hyperlink to the supplemental media asset of the plurality of supplemental media assets.

In some embodiments, the system further detects at least one or more terms in a headline of the media asset. The one or more terms are designated for enhancement. The system may mask the one or more terms in the headline of the media asset. In this context, "masking" means any one of covering up, redacting, or replacing a term. The masking the one or more terms generates an enhanced headline for the media asset. In some embodiments, the system detects at least one or more terms in the headlines of the plurality of supplemental media assets. The system may mask the one or more words in the headlines of the supplemental media assets. The masking the one or more terms generates enhanced headlines for the plurality of supplemental media assets.

In some embodiments, detecting at least one or more terms in the headline of the media asset is performed by extracting one or more descriptors from the headline and calculating an efficacy value for the one or more descriptors based on historical behavior data of the user profile. Based on the efficacy value of the one or more descriptors being below a threshold, the system updates the headline with one or more reconstruction descriptors.

In some embodiments, the system receives a search input. Based on receiving the search input, the system generates a search result. The search result includes a plurality of selectable links. Each selectable link of the plurality of selectable links is associated with a media asset of the plurality of media assets. The system then receives a selection of a selectable link of the plurality of selectable links for presentation on the user device. Based on receiving the selection of the selectable link, the system generates for display the media asset associated with the selectable link and the interactive timeline of selectable links to each supplemental media asset.

In some embodiments, the systems and methods are configured for masking a portion of a media asset. The system performs masking by identifying a portion of the media asset suggested for presentation on a user device. The system determines at least one or more elements in the portion of the media asset as designated for enhancement. The system accesses user preferences associated with a user profile associated with the user device. Based on user preferences, the system updates the at least one or more elements in the portion of the media asset as designated for enhancement. The system then generates the updated portion of the media asset on the user device.

In some embodiments, the system determines at least one or more elements in the portion of the media asset as designated for enhancement by determining that one or more elements in the portion of the media asset that include text. In some embodiments, the media asset may include one or more of text, image, audio, or video. The system, using natural language processing, identifies entities mentioned in the text in the portion of the media asset and tags the identified entities with identifier tags. In some embodiments, the portion of the media asset is one or more of a title of the media asset, an abstract of the media asset, a summary of the media asset, or a preview of the media asset. In some embodiments, the system extracts one or more descriptors from the portion of the media asset. The system then calculates an efficacy value of the one or more descriptors on the user profile based on historical behavior data of the user profile. The system then selects a reconstructed descriptor from the at least one descriptor according to the weight values.

In some embodiments, the system further receives, from the user device, a selection of a selectable link to the media asset. The system retrieves metadata associated with the media asset. The metadata may include identifier tags of segments of the media asset and date of the media asset. The system identifies a plurality of supplemental media assets. A supplemental media asset of the plurality of supplemental media assets comprises one or more elements in a portion of the supplemental media asset. Based on the user preferences, the system identifies the at least one or more elements in the portion of the supplemental media asset as designated for enhancement. The system generates for presentation, on the user device, the media asset and an interactive timeline. The interactive timeline may include selectable links to each supplemental media asset of the plurality of supplemental media assets. The selectable links to each supplemental media asset and the media asset are organized based on the date.

The system receives a selection of a selectable link of the plurality of selectable links from the interactive timeline to the supplemental media asset of the plurality of supplemental media assets. Based on receiving a selection, the system retrieves for presentation the supplemental media asset of the plurality of supplemental media assets. The selectable link is an automatic hyperlink to the supplemental media asset of the plurality of supplemental media assets. In some embodiments, the interactive timeline of selectable links may include a layered interactive timeline, wherein the layered interactive timeline comprises a first layer of a first plurality of supplemental media assets configured for a first identifier tag, and a second layer of a second plurality of supplemental media assets configured for a second identifier tag.

It should be noted that the systems, methods, apparatuses, and/or aspects described above may be applied to or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 2A and 2B show an exemplary scenario 200 for masking a portion of a media asset, in accordance with some embodiments of the disclosure;

DETAILED DESCRIPTION

Systems and methods are disclosed herein for a media guidance application (e.g., implemented on a user device) that generates a dynamic timeline of related media assets based on content selected by a user. For example, a user may select a news story while viewing a news channel, to receive updates about the news story. The media guidance application may determine keywords that represent the news story selected by the user, and search for news updates by comparing keywords. The media guidance application may also search for past news stories associated with the news story selected by the user, to ultimately generate an intuitive user interface (e.g., timeline) that allows the user to access content associated with the user's selection. Generating the dynamic timeline of media assets associated with user-tagged content allows users to view the specific content of their choosing without having to search for all available media from all available sources.

Suppose that a user is consuming a news report about a sports team on ESPN. Based on his/her interest, the user may choose to select (e.g., tag) the story via the media guidance application. Upon receiving a request to tag the news story the user is currently consuming (e.g., watching, reading, listening), the media guidance application may identify (e.g., via control circuitry 404 (of FIG. 4 description)) the news story as the media asset. A media asset (also referred to as a "news publication") may be of any medium that presents information to a user (e.g., video, audio, text, game, etc.).

The media guidance application may then initiate a process to determine a class of the media asset, wherein the class of the media asset represents the general topic of the media asset. For example, news reports about sport teams, players, and social events may share a class. The media guidance application may extract metadata associated with the media asset. For example, each media content object may be transmitted from the media guidance source 518 (of FIG. 5) along with its respective metadata. The metadata may include information such as title, transmission time, content provider, genre, description, media type, etc. The media guidance application may determine (e.g., via control circuitry 404 (of FIG. 4)) a class of the media content object from the respective metadata, or subtitles, audio, and visuals that may be associated with the media asset.

Figure 1:
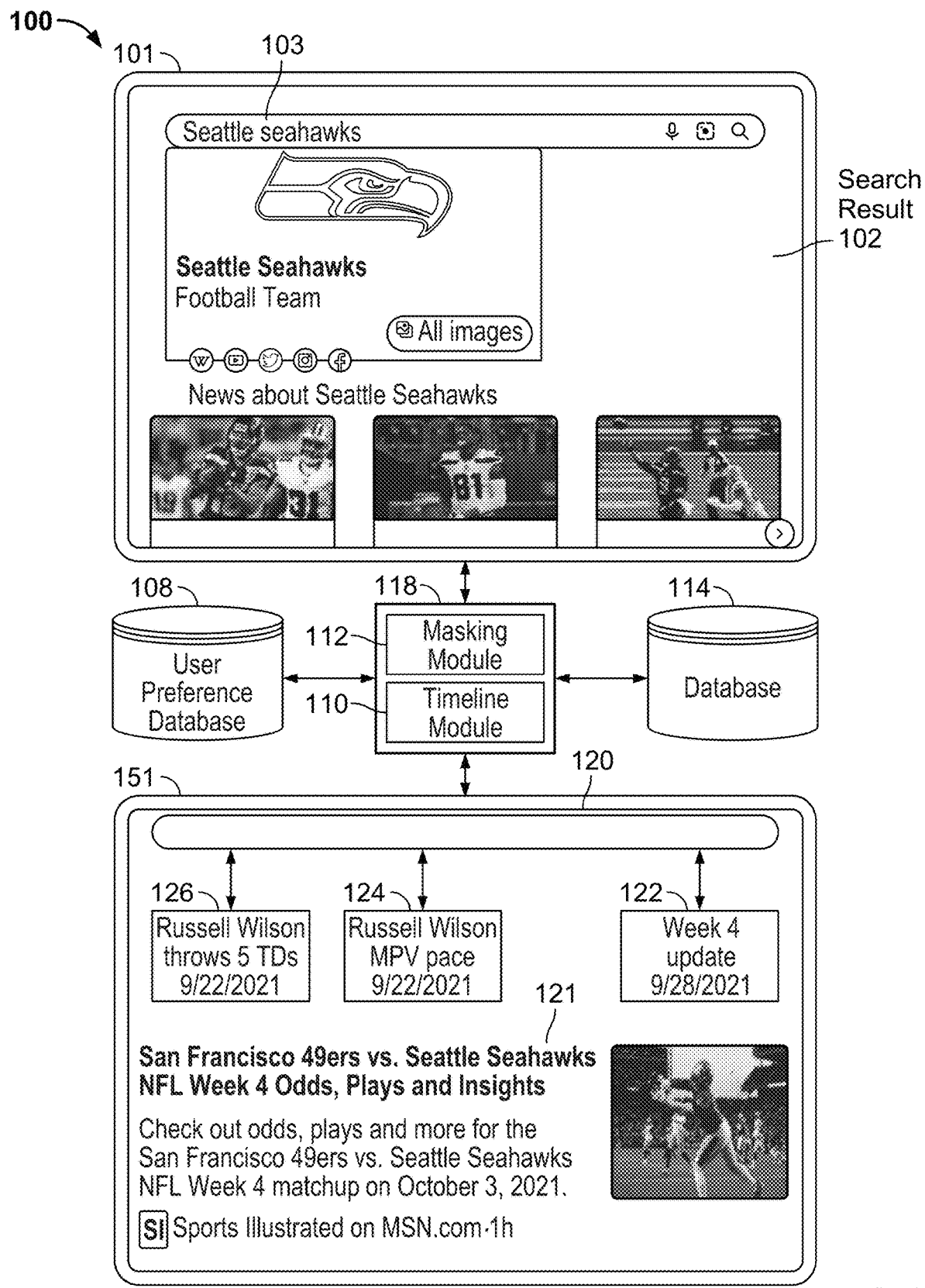
FIG. 1 shows an exemplary scenario 100 for generating a dynamic timeline for selection of media content, according to some embodiments of the disclosure.

FIG. 1 shows an exemplary scenario 100 for generating a dynamic timeline for the selection of media content, according to some embodiments of the disclosure. As shown in FIG. 1, the scenario allows the user to search on a user device 101 for media content (e.g., Seattle Seahawks) and select a link to view any one of the media assets that are identified. FIG. 1 further shows a server 118 that is communicatively connected to the user device and receives the user selection searching for media assets related to the Seattle Seahawks. The server 118 includes a masking module 112 (discussed in FIG. 3) and timeline module 110. The server is communicatively connected to the database 114 of media assets (e.g., new articles accessed free or via subscription) and user preferences database 108. In response to the server 118 receiving the selection, the control circuitry 404 (of FIG. 4) analyzes the media asset for keywords and or event and performs a search for similar or related supplemental media assets.

Upon receiving the user's selection of the media asset (e.g., Seattle Seahawks), the media guidance application may identify a time period for searching for supplemental media assets. In some embodiments, the media guidance application may then measure a time period to search for supplemental media assets.

The media guidance application may then determine whether a supplemental media asset shares common subject matter with the media asset by comparing the keywords from the media asset to the keywords from the supplemental media asset. The media guidance application may use predetermined thresholds to evaluate whether there is enough similarity between the media asset and the supplemental media asset. A threshold may be a quantitative (e.g., percentage, fraction) or qualitative (e.g., "similar," "not similar") value that represents the boundary that must be satisfied. For example, the low threshold may be the minimum amount of keywords that overlap. The media guidance application (via control circuitry 404 (discussed in FIG. 6 description)) may determine that the supplemental media asset has common subject matter with the media asset if the low threshold is met.

Once the supplemental media assets are identified, the control circuitry generates a dynamic timeline 120 of the media asset 121 (e.g., Week 4 recap for Seattle Seahawks) and the supplemental media asset. For example, as shown in FIG. 1, on display screen 151, the media guidance application presents a timeline of three media assets ordered based on their respective release times, in accordance with some embodiments of the disclosure. Timeline module 110 indicates the title and the associated release date of the media asset. In some embodiments, if the user has selected multiple media assets of subject matter (e.g., Seattle Seahawks and Russell Wilson), timeline module 118 may include the supplemental media assets related to both of those selections. In FIG. 1, three media selectors are depicted, each representing a different supplemental media asset. A date tracker represents the range of time in which the media content item shown in the media selectors were transmitted (e.g., based on release times). The user may scroll through additional media assets (if any exist), by selecting the hyperlink.

In some embodiments, an automatic update of a title or subject of an article in order to reflect events occurring in real time (e.g., a score that puts a team in the lead) is described More specifically, the system may automatically generate/update a title of an article based on real-time data (e.g., scores) and even historical data (e.g., when a record is broken: say a quarterback threw seven touchdowns in a single game or a running back scored x-touchdowns in a single quarter). In some embodiments, the system would provide a service that is used to update outdated articles based on templates that are topic-based (e.g., sport type (baseball, football), politics (domestic, foreign), etc.

In some embodiments, the system may automatically generate an interactive timeline (e.g., scrollable, or clickable) that is related to the article that's currently being read by a user, for example, in response to an article being consumed about a favorite sports team when such an article is specific to last night's football game (e.g., Seahawks vs 49'ers). The content of such an article would normally be focused on the events that happened during last night's game, but the reader might be interested in more historical data without having to search again and sift through a lot of other articles. The interactive timeline is dynamically constructed to display markers that are clickable and would retrieve the content of other related articles around the same topic (e.g., the other games where the Seahawks and the 49'ers played). In another example, the system can automatically explore hyperlinking specific events/topics in the current article where such events or topics are also present in another related article. For example, the first sentence in the article could be something like "The Seattle Seahawks convincingly defeated the 49'ers . . . ." Automatically hyperlinking this sentence, based on natural language understanding, in order to retrieve and display information (e.g., by hovering over a term in the sentence) about other game(s) where these two teams faced off and one of them "convincingly" defeated the other might be useful supplemental data to the reader. In some embodiments, the system can have a dedicated space on the page to display this information as a side-by-side comparison. In some embodiments, the system can just display specific metadata such as score of the previous game, date of the previous game, etc. Similarly, if a specific player is mentioned in the article, then the same process applies. This service is an "overlay" that automatically enhances the content of an article in a specific domain (e.g., sports). Authors can turn on this feature for an article that they write and can specify the "context" to hyperlink (e.g., scores, rushing yards, etc.). This way, the opinions of the author are not modified. In some embodiments, the system can also allow the author to preview the article before publication to see what terms would get hyperlinked, etc. In a way, this could be a tool authors use to write articles (instead of using a Word app, for example). The tool has domains (e.g., sports, politics, weather, etc.), and such domains have access via various APIs to various data sources (e.g., player stats available publicly from the NFL website, private sources, etc.). Since the article belongs to the "sports" domain, the system can rely on available sports metadata to construct the hyperlinks/additional info. The timeline for that same article can be updated later since the same two teams might play four weeks later.

In some embodiments, the system may generate an interactive timeline when a user searches for a team, and first displaying an article associated with their latest game. In some embodiments, in response to selecting to view the media asset (e.g., an article), the media guidance application may generate a scrollable timeline of supplemental media assets. In some embodiments, in response to selecting to view the media asset (e.g., an article), the media guidance application may generate a clickable timeline of supplemental media assets. Clicking on portions of the timeline can retrieve and present other articles related to the team without having to go back to the search bar, type, click, etc. The timeline can be layered; for example, one layer is specific to general team scores, another layer can be specific to players, etc. In some embodiments, the system retrieves all this data without the need to leave the page, type search words again, etc.

FIGS. 2A and 2B show an exemplary scenario 200 for masking a portion of a media asset, in accordance with some embodiments of the disclosure. FIG. 2A shows an illustrative example of a search result that is enhanced by creating an intriguing heading that entices the user to click on the link. The search results 200A include top stories 203, a number of icons listed with different news articles in a block view. The block view shows three news stories from different news sources, each representing a different story. The system identifies the middle story 201 as a story that may include portions for enhancement. The middle story 201 has a heading 204 the includes "RR vs. SRH, XXXXXX scores maiden IPL century off 56 balls," where the letters are "XXXXXX" is used to mask the athlete's name. The masking of the player's name is done to entice the user to click on the link to find out who scored the maiden IPL. In another example, the player's name may remain, and another fact from the heading may be masked. By clicking on the link, the user can consume the entire news article and find out who the athlete was who scored the maiden IPL. In some embodiments, when the user comes across the same news article multiple times, the system may recognize that the user had previously unmasked the redacted portion. Instead of masking it again, the system may present an original unmasked heading for the news article.

FIG. 2B shows an illustrative example of a search result that is enhanced by creating a different heading that entices the user to click on the link. Similar to FIG. 2A, where the information was redacted, in FIG. 2B the information is masked by providing an alternate masking format (e.g., "See who"). The block view shows three news stories from different news sources, each representing a different story. The system identifies the middle story 251 as a story that may include portions for enhancement. The middle story 251 has a heading 254 that includes "RR vs. SRH, See who scores maiden IPL century off 56 balls," where the "See who" replaces the athlete's name.

In an embodiment, a publishing platform (e.g., Facebook, MSN, Google, Yahoo, etc.) receives content (and/or a link to the content) together with a predetermined content/link headline. The platform identifies key details in the headline, for instance, using natural language processing and named-entity disambiguation techniques to identify entities mentioned in the headline. The platform further analyzes the content itself to identify and tag content segments or mentions associated with the identified entities. The platform enhances or personalizes the headline to obscure an identified entity, and when a user clicks on the headline link, the platform provides access to the content but jumps directly to a tagged portion in the content that corresponds to the obscured entity. In other examples, the platform rearranges the content itself to group and/or bring to the "top" tagged portions in the content that correspond to the obscured entity. These techniques are particularly useful when the linked content relates to various entities and allows a user to click on an interesting headline and be brought directly to the relevant portions of the content.

Additional techniques relate to replacing an entity in a headline link with related content of interest to a user, but still with the intention of obscuring the original entity to encourage user clickthrough. In some embodiments, the original entity is replaced with a related entity determined, for example, by named entity disambiguation techniques based on a knowledge graph derived from a knowledge base (e.g., Wikipedia, sport organization website, IMDb, etc.). More particularly, an original entity from the headline corresponds to a vertex in the knowledge graph, and a directed edge from that original entity/vertex leads to another entity/vertex, which is used to replace the original entity from the headline—referring to the example in the FIGS. 2A and B, "Jos Buttler" may be replaced with "RR star." Jos Buttler is a player on the team RR (Rajasthan Royals), and the knowledge graph includes an edge connecting vertices for "Jos Buttler" and "RR."

In some embodiments, the disclosure relates to analyzing a plurality of headlines and content that are displayed together, and similarly enhancing multiple headlines or modifying the display to include only enhanced headline(s). This is beneficial where a display includes different headline links directed to the same or similar content, and enhancing one headline while leaving other headline(s) unmodified would reveal the obscured entity.

Figure 3:
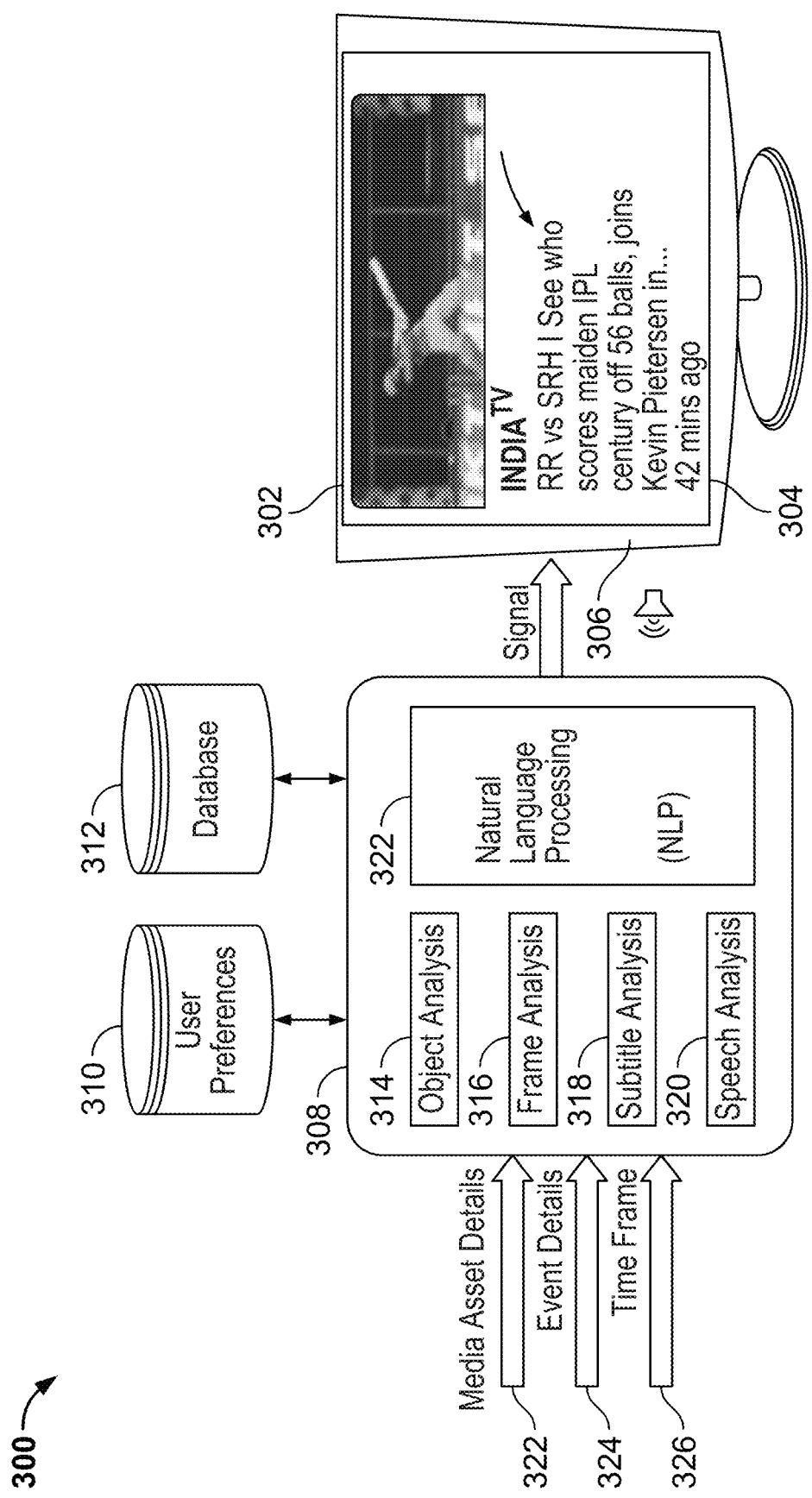
FIG. 3 shows an alternate exemplary scenario 300 for masking a portion of a media asset, in accordance with some embodiments of the disclosure.

FIG. 3 shows an alternate exemplary scenario 300 for masking a portion of a media asset, in accordance with some embodiments of the disclosure. FIG. 3 further shows a system that performs processing of the media assets upstream of the user device. The system includes an analyzer 308, which analyzes the varying media assets to identify events that the user may be interested in. In particular, the analyzer 308 receives the media asset details 322, metadata pertaining to the media asset 324 and time frame 326 and performs object analysis 314, frame analysis 316, subtitle analysis 318, speech analysis 320 and/or natural language processing 322. As part of an object analysis 314, the processing circuitry monitors for objects within a media asset. In some embodiments, object analysis 314 performs an analysis of athletes in the media asset. As part of a frame analysis 316, the processing circuitry monitors images or frames within a media asset for brightness, speed and general layout. In some embodiments, frame analysis 316 performs an analysis of locations within the media asset. As part of a subtitle analysis 318, the processing circuitry monitors the text, including the title, summary, and body of the media asset for keywords that may interest the user. This data may be stored in association with a character or a media asset. As part of natural language processing 322, control circuitry performs an analysis of language and tries to determine the subject matter discussed. In some embodiments, the processing circuitry compares, based on the analysis, each segment of the media asset with user preferences. In some embodiments, the processing circuitry determines that a segment of the supplemental media asset matches the user preferences and the keywords of the media asset. When the supplemental media asset matches the user preferences and the keywords, the system may include the supplemental media asset in the timeline for the media asset. In some embodiments, in response to selecting to view the media asset, the media guidance application may generate for display on the user device on dual screens, with a media asset on one screen and a scrollable timeline of supplemental media assets on the second.

In some embodiments, the media guidance application may, when performing the analysis, based on metadata of an important event/feature (e.g., descriptive result in the title) in the media asset, access a database 312 corresponding to a search for supplemental media assets corresponding to the keywords or important events in the media asset. The database may be stored locally or may be stored on a remote server. The keywords or important events are determined based on the analysis of the media asset and the user preferences. For example, the user may enjoy reading about a certain football team after a win.

In some embodiments, to avoid masking each media asset, the system may measure the efficacy rates of keywords in the media asset before enhancement and after being enhanced. In some embodiments, the system may employ an efficacy measure for the media asset by the formula:

$$E = \frac{L_E}{L_O} - 1$$

E represents efficacy measure, LO represents the likelihood the user will click the original headline; LE represents the likelihood the user will click the enhanced headline. In some embodiments, the system will enhance the headline before presenting it to the user only if E>T, where T is a certain threshold. In some embodiments, the threshold value T is different for different users based on user preferences.

In some embodiments, After making the enhancement, the system does monitor the behavior and consumption of the user. Based on the click-through success or failure, the system may adjust the terminology to improve the click-through success rate. It also enhances the value T via this feedback.

Figure 4:
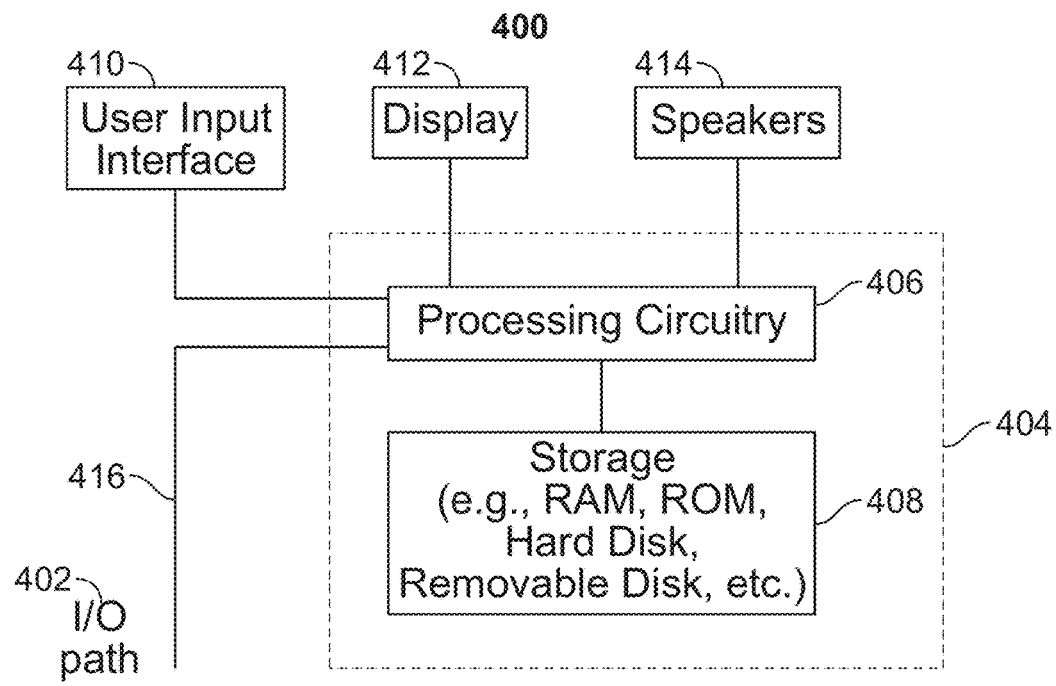
FIG. 4 is a block diagram of an illustrative device for generating a dynamic timeline for selection of media content, in accordance with some embodiments of the disclosure.

FIG. 4 is a block diagram showing components and data flow therebetween of a system for generating a dynamic timeline for selection of media content, in accordance with some embodiments of the disclosure. Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 502 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to media asset sources to retrieve a media asset and supplemental media asset. I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 504 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client/server-based embodiments, control circuitry 404 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video generating, encoding, decoding, encrypting, decrypting, scaler, and analog/ digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low-temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the news articles as selected via I/O 402 using a display 412 may be in the form or a text, podcast, audio segment video and audio segment or a combination thereof. In some embodiments, the identified timeline may be distributed to a display 412, which processes and outputs the timeline.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client/server-based application. Data for use by a thick or thin client implemented on user equipment device 400 is retrieved on-demand by issuing requests to a server remote to the user equipment device 400. In one example of a client/server-based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
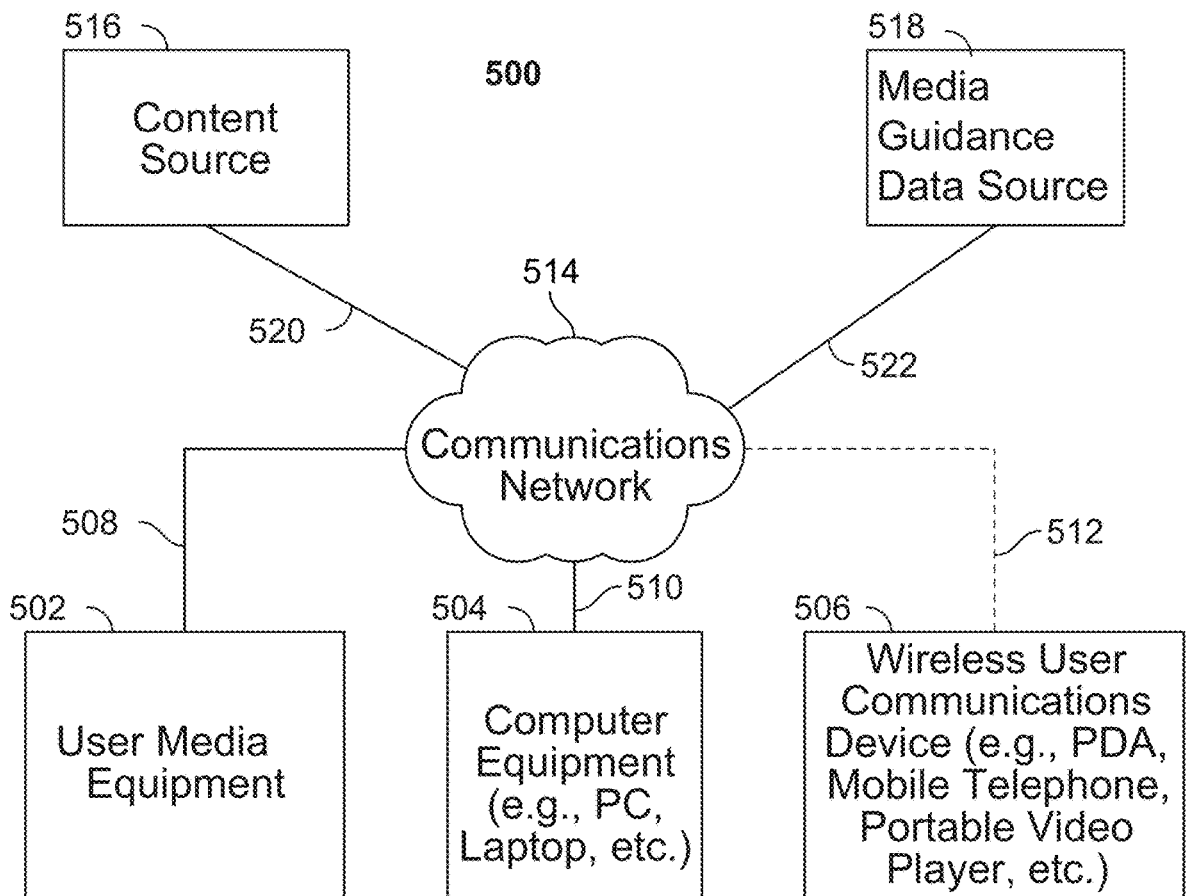
FIG. 5 is a block diagram of an illustrative media guidance system for generating a dynamic timeline for selection of media content and masking portions of content, in accordance with some embodiments of the disclosure.

User equipment device 400 of FIG. 4 can be implemented in system 500 of FIG. 5 as user television equipment 502, user computer equipment 6504, wireless user communications device 506, or any other type of user equipment suitable for accessing content, such as news reports and video report and any other media assets. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

FIG. 5 is a block diagram of an illustrative system for generating a dynamic timeline of media content based on a selection of a media asset, in accordance with some embodiments of the disclosure. A user equipment device utilizing at least some of the system features described above in connection with FIG. 5 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a website accessed by a web browser. In another example, the guidance application may be scaled down for wireless user communications devices 506.

In system 500, there is typically more than one of each type of user equipment device, but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting the settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications networks or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5, it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client/server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions, which may be stored in storage 408, and executed by control circuitry 404 of a user equipment device 400. In some embodiments, media guidance applications may be client/server applications where only a client application resides on the user equipment device, and server application resides on a remote server. For example, media guidance applications may be implemented partially as a client application on control circuitry 404 of user equipment device 502 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches or in a system employing other approaches for delivering content and providing media guidance.

Figure 6:
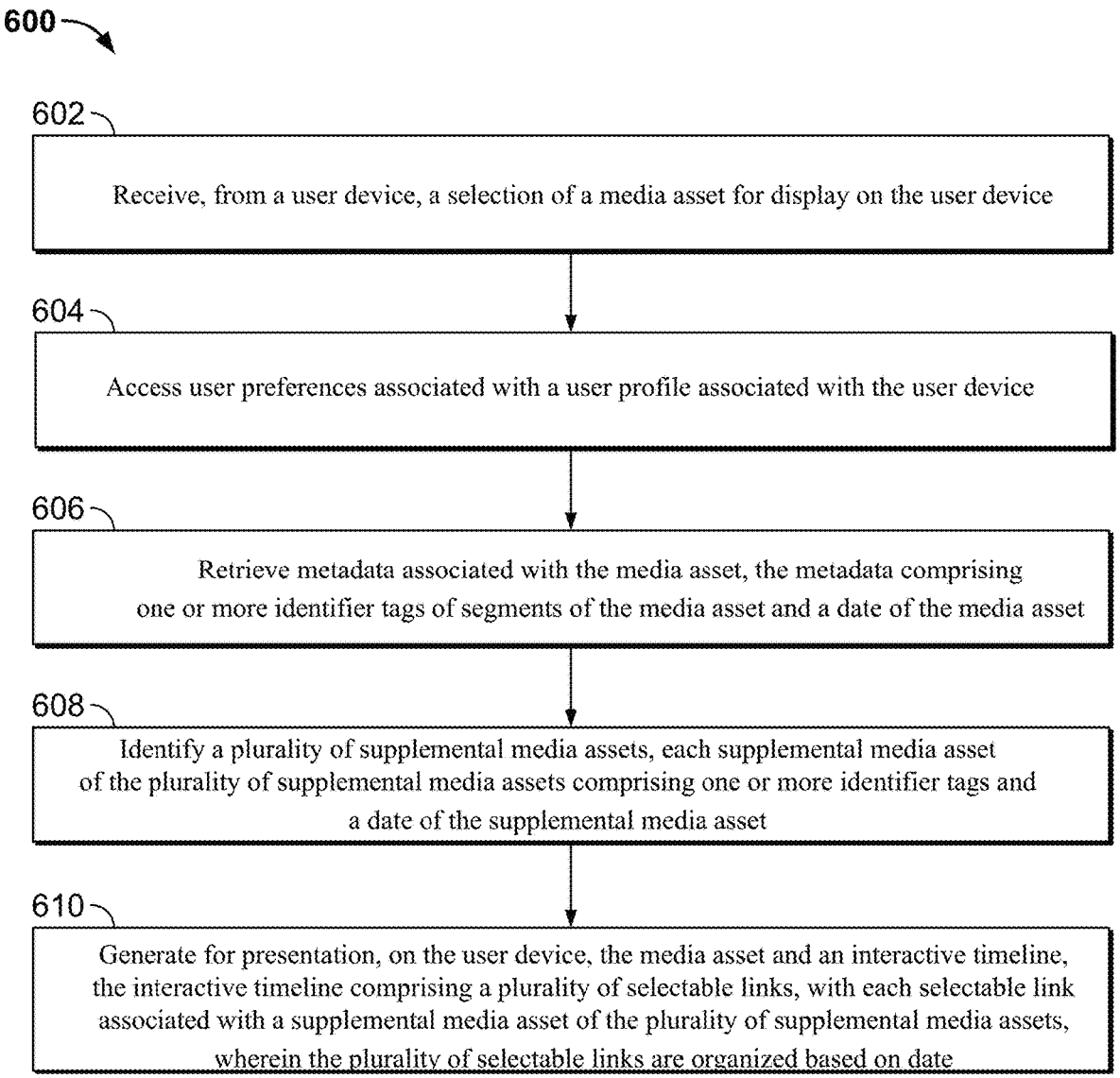
FIG. 6 is a flowchart of an illustrative process for generating a dynamic timeline for selection of media content, in accordance with some embodiments of the disclosure.

FIG. 6 is a flowchart of an illustrative process for generating a dynamic timeline for selection of media content, in accordance with some embodiments of the disclosure. It should be noted that process 600 or any step thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5)) in order to generate a dynamic timeline for selection of media content. In addition, one or more steps of process 600 may be incorporated into or combined with one or more steps of any other process or embodiment (e.g., as described in relation to FIGS. 1-3 and 6-8 and 10-11).

At step 602, control circuitry 404 (FIG. 4) receives, from a user device, a selection of a media asset for display on the user device. In some embodiments, the selection is a tagging of a news story of interest. In some embodiments, the selection is a selection to consume that media asset at that time. Continuing from the previous example, suppose that the user is viewing a news report on ESPN about a sports team in Seattle. Control circuitry 404 may allow the user to tag (i.e., select) the story through a user input interface 410 on display 412. Based on his/her interest, the user may end up tagging the story. In some embodiments, the user's interest may be determined based on historical data associated with the user profile. Control circuitry 404 may receive a selection associated with the media asset (e.g., a news story) via I/O path 402.

At step 604, control circuitry 404 accesses user preferences associated with a user profile associated with the user device. Such data may be accessed from a user profile database or any other database configured to store the user's consumption history and preferences.

At step 606, control circuitry 404 retrieves metadata associated with the media asset, the metadata comprising one or more identifier tags of segments of the media asset and a date of the media asset. For example, control circuitry 404 may extract metadata from the media asset or retrieve the metadata from the media guidance data source 518 (FIG. 5). The metadata may include information about the media asset, features, or characters from the heading, such as time of transmission, title, media type, description, content provider, and genre. Control circuitry 404 may choose one of these information types and identify the information type as a characteristic.

At step 608, control circuitry 404 identifies a plurality of supplemental media assets, each supplemental media asset of the plurality of supplemental media assets comprising one or more identifier tags and a date of the supplemental media asset. In some embodiments, control circuitry performs a search of the plurality of content sources (518) for media assets that include more than a threshold of the plurality of keywords associated with the media asset.

At step 610, control circuitry 404 generates for presentation on the user device the media asset and an interactive timeline, the interactive timeline comprising a plurality of selectable links, with each selectable link associated with a supplemental media asset of the plurality of supplemental media assets, wherein the plurality of selectable links are organized based on the date. For example, control circuitry 404 may link the media asset and supplemental media assets with the media asset timeline and may receive a user request to access the media asset upon clicking the respective hyperlink (e.g., via I/O path 402). The media playlist may feature a merged media asset of the media asset and supplemental media assets. The media timeline may also keep the media asset and supplemental media assets separate, but in an order based on release time or relevance.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 6.

Figure 7:
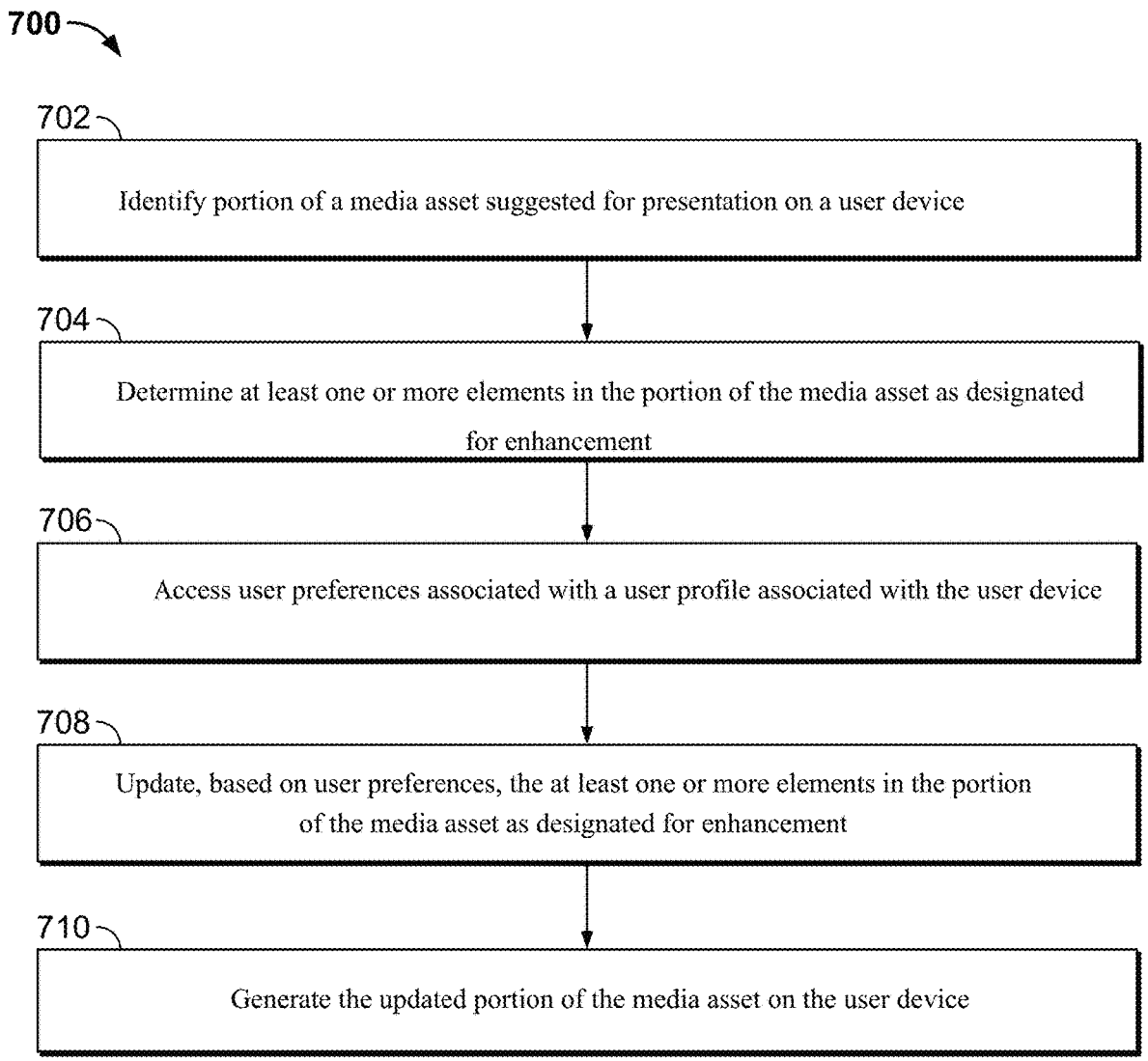
FIG. 7 is a flowchart of an illustrative process for masking a portion of a media asset, in accordance with some embodiments of the disclosure.

FIG. 7 is a flowchart of an illustrative process for masking a portion of a media asset, in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to mask portions of a media asset to enhance the likelihood that a news article will be selected by the user. In addition, one or more steps of process 700 may be incorporated into or combined with one or more steps of any other process or embodiment (e.g., as described in relation to FIGS. 1-3 and 6, and 8-11).

At step 702, control circuitry 404 identifies the portion of the media asset suggested for presentation on a user device. For example, in response to a user entering a search, a result is presented with summaries, titles and key figures that the author of the article may prepare. These portions that are displayed may be evaluated based on their tendency to lead to the user selecting the article. For example, when the users tend to skip the article, the title and/or the summary may not leave much intrigue and interest to click through to the article. Thus these portions of the media asset are identified for enhancement.

In some embodiments, the selection is a tagging of a news story of interest. Continuing from the previous example, suppose that the user is viewing a news report on ESPN about a sports team in Seattle. Control circuitry 404 may allow the user to tag (i.e., select) the story through a user input interface 410 on display 412. Based on his/her interest, the user may end up tagging the story. In some embodiments, the user interest may be determined based on historical data associated with the user profile. Control circuitry 404 may receive a selection associated with the media asset (e.g., news story) via I/O path 402.

At step 704, control circuitry 404 determines at least one or more elements in the portion of the media asset as designated for enhancement. In some embodiments, the media asset may be prepared with alternate keywords that may be switched between users based on their respective preferences or identified tendencies. For example, control circuitry 404 may extract metadata from the media asset, or retrieve the metadata from the media guidance data source 518 (FIG. 5). The metadata may include information about the media asset, features, or characters from the heading, such as time of transmission, title, media type, description, content provider, and genre. Control circuitry 404 may choose one of these information types and identify the information type as a characteristic that may be enhanced for the user.

At step 706, control circuitry 404 accesses user preferences associated with a user profile associated with the user device. Such data may be accessed from a user profile database or any other database configured to store the user's consumption history and preferences.

At step 708, control circuitry 404 (FIG. 4) updates, based on user preferences, the at least one or more elements in the portion of the media asset as designated for enhancement. Control circuitry 404 may retrieve, from the subject matter database in storage 408, a masking type (e.g., remove player names, remove team names, remove scores, remove adverbs or replace one or more terms with a generic term) associated with a sports report. In some embodiments, the control circuitry may mask the team name, player name, player score or other parts of the headline to get a higher click-through on the news article. That is, different users will see differently enhanced text for the same headline to a news article.

At step 710, control circuitry 404 (FIG. 4) generates the updated portion of the media asset on the user device. For example, control circuitry 404 may generate the media asset on the display with one or more terms updated (e.g., masked, redacted or replaced). The updated supplemental media asset is enhanced to entice the user to select it, with for example, a heading for a sports team that features the user's favorite player.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 7.

Figure 8:
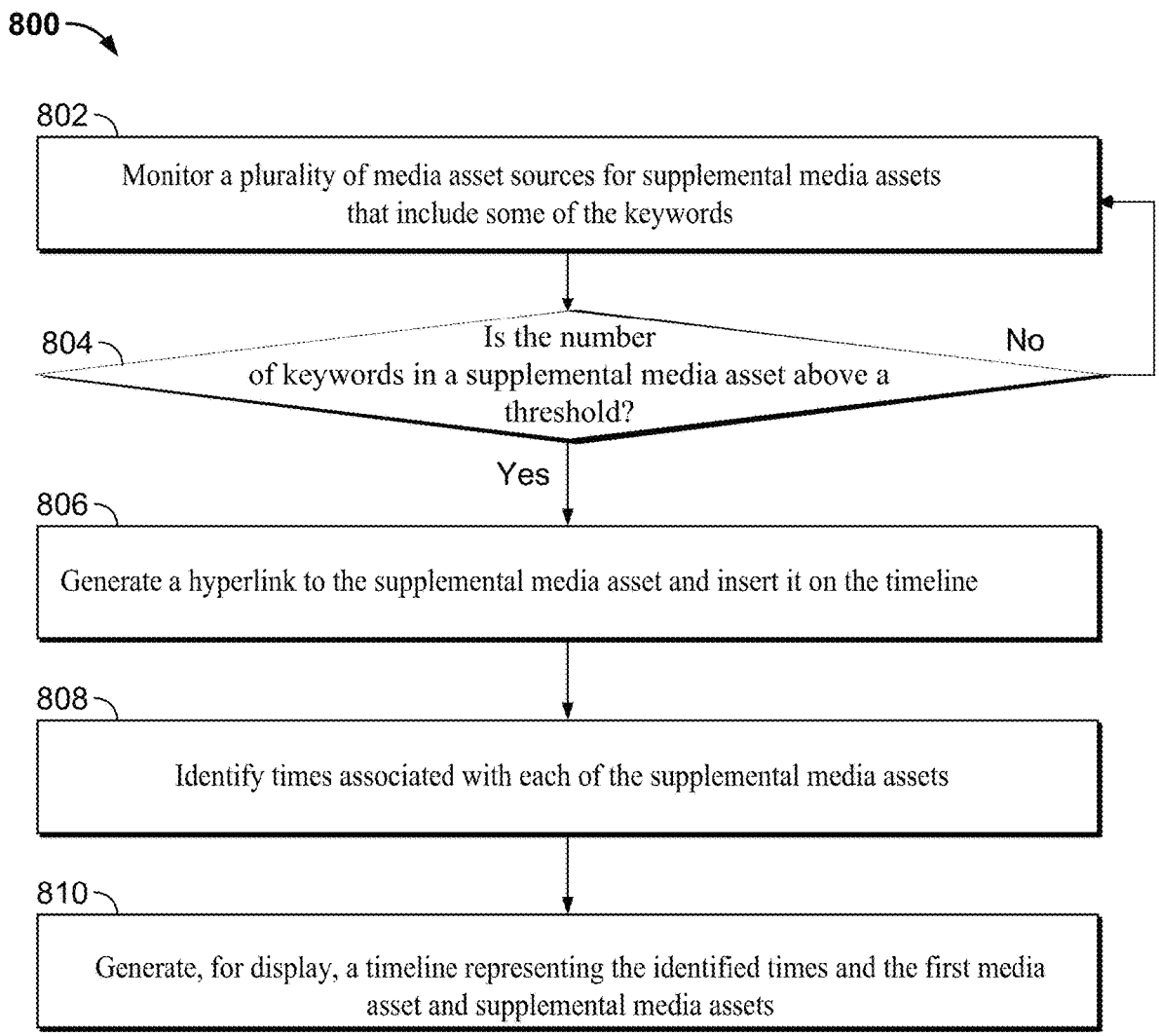
FIG. 8 is a flowchart of a detailed illustrative process for generating, for display, a timeline representing identified times of stored media content items, in accordance with some embodiments of the disclosure.

FIG. 8 is a flowchart of a detailed illustrative process for generating, for display, a timeline representing identified times of stored media content items, in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to generate, for display, a timeline representing identified times of media assets. In addition, one or more steps of process 800 may be incorporated into or combined with one or more steps of any other process or embodiment (e.g., as described in relation to FIGS. 1-3 and 6-7 and 9-11).

At step 802, control circuitry 404 (FIG. 4) monitors a plurality of content sources for supplemental media assets that include some of the keywords. For example, control circuitry 404 may detect an additional news story about the Seattle Seahawks from the media content source 516 (FIG. 5). The additional news story may be a news story where Seattle last played the same opponent or had a similar outcome of a game and may be identified as a supplemental media asset by control circuitry 404. For example, the additional news story may account for the quarterback's recent success playing against this type of team. Control circuitry 404 may utilize natural language processing and computer vision to extract subtitles and words on the screen during the news report.

At step 804, control circuitry 404 (FIG. 4) determines whether a number of keywords included in the supplemental media asset is above a threshold. In some embodiments, control circuitry 404 may also execute process 1000 (FIG. 10) to ensure that the supplemental media asset shares common subject matter with the media asset. Control circuitry 404 may then retrieve from storage the threshold, which may be, for example, 80%. Therefore, if the supplemental media asset shares 80% or higher of its keywords with the keywords from the media asset, control circuitry 404 may determine to include the supplemental media asset on the timeline. In the example given, if the shared keywords in the supplemental media asset only account for 72% of the total keywords in the media asset, which is less than the threshold, control circuitry will determine not to include the supplemental media asset on the timeline.

At step 806, control circuitry 404 (FIG. 4) generates a hyperlink to the supplemental media asset and inserts it into a timeline. If the amount exceed the threshold, the process returns to step 802, and control circuitry 404 monitors for a different supplemental media asset.

At step 808, control circuitry 404 (FIG. 4) identifies times associated with each media asset. The time is the time at which a media asset is transmitted by the content provider and may be retrieved from the media guidance data source 518 (FIG. 5). For example, the release time for the news broadcast about the Week 4 report (e.g., media asset) may be Sep. 27, 2021, at 4:00 pm. The time for the news update about the Seattle Seahawks being identified (e.g., supplemental media asset) may be Sep. 20, 2021, at 1:00 pm.

At step 810, control circuitry 404 (FIG. 4) generates, for display, a timeline (e.g., presented in FIG. 1) representing the identified times and the media asset and the supplemental media assets, wherein the timeline includes indicators of information pertaining to time (e.g., last time the team played, last time they won by such a score) associated with the supplemental media asset. The timeline may be shown on user input interface 410 on display 412. As discussed in FIG. 1, the timeline may display buttons (e.g., hyperlinks) that quickly retrieve the previous news stories to the respective supplemental media assets in storage.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 8.

Figure 9:
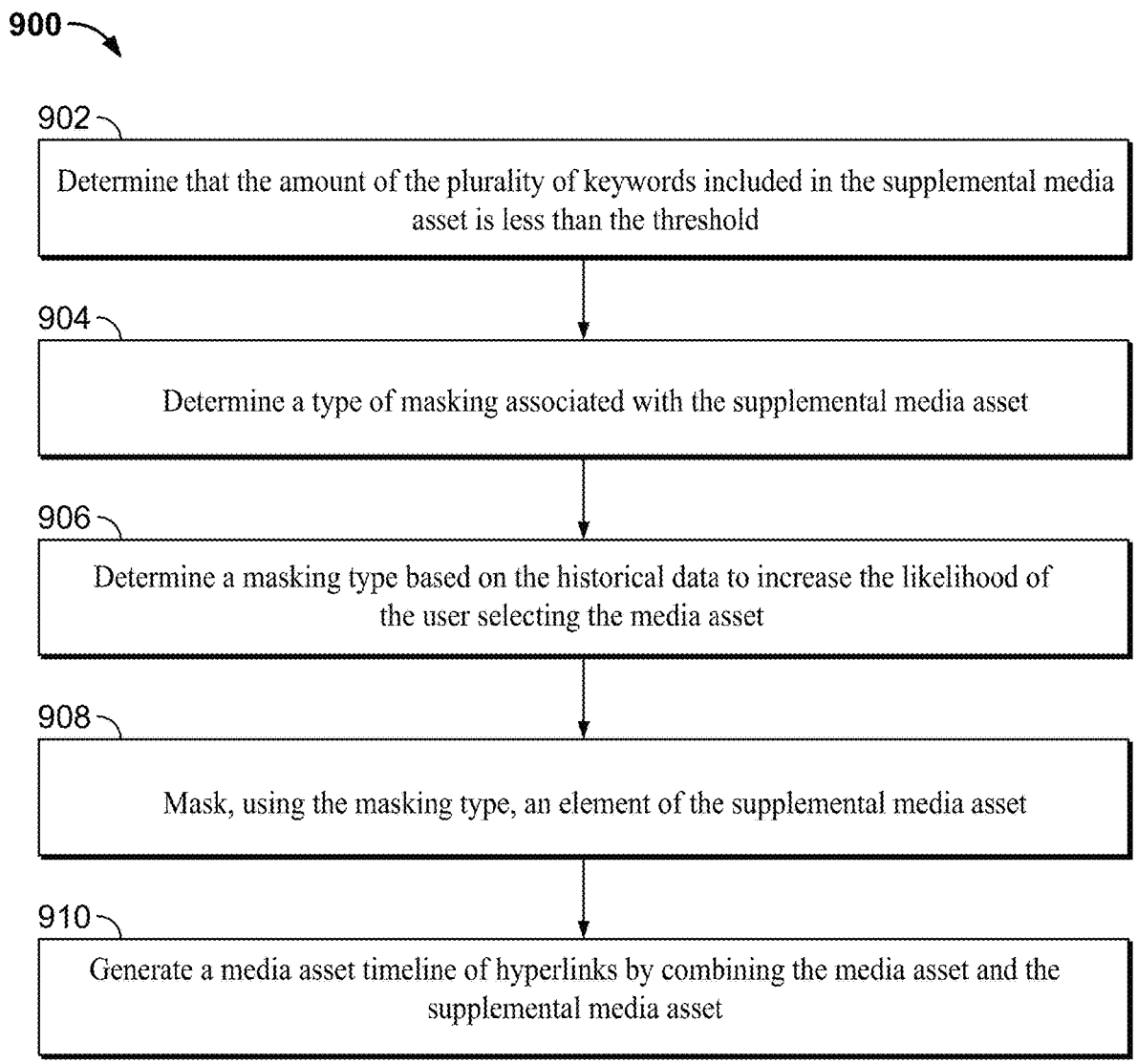
FIG. 9 is a flowchart of a detailed illustrative process for generating a timeline and alerting the user of the supplemental media asset, in accordance with some embodiments of the disclosure.

FIG. 9 is a flowchart of a detailed illustrative process for generating a timeline and alerting the user of the supplemental media asset, in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5)) in order to determine an amount of the keywords included in the supplemental media asset. In addition, one or more steps of process 900 may be incorporated into or combined with one or more steps of any other process or embodiment (e.g., as described in relation to FIGS. 1-3 and 6-8 and 10-11).

At step 902, control circuitry 404 (FIG. 4) determines that the amount of the plurality of keywords included in the supplemental media asset is less than the threshold. The threshold is associated with the efficacy amount for a media asset. For example, when the efficacy for keywords is above a threshold, the user is likely to select the media asset. On the other hand, when the efficacy value is below the threshold, the supplemental media asset may be designated for enhancement because the user is not likely to select it. As discussed previously, in response to determining that the amount is less than the threshold, control circuitry 404 identifies the keywords for enhancement for presentation on the user device. This signifies that the supplemental media asset shares common subject matter with the media asset and includes additional information relating to the subject matter and, if enhanced, may increase user interest in selecting the supplemental media asset.

At step 904, control circuitry 404 (FIG. 4) determines a type of masking associated with the supplemental media asset. The type of masking is associated with the options displayed to the user (e.g., quarterback, Russell Wilson, weekly score, etc.). For example, control circuitry 404 (FIG. 4) may determine whether the amount of option keywords included in the supplemental media asset is less than an options threshold. As discussed previously, option keywords are predetermined by control circuitry 404 and are associated with the user-selected options. For example, the topic of a sports team report may be associated with option keywords such as "quarterback," "Russell Wilson," "weekly score," etc. If the amount of option keywords exceeds the options threshold, control circuitry 404 may determine the type of masking associated with the supplemental media asset (e.g., masking the team score). A similar type of masking may be based on the masking associated with redacting a name of a player or adverb based on performance. For example, by enhancing the title of sports news report, the supplemental media assets need to be masked in a similar way to avoid revealing the new information.

At step 906, control circuitry 404 (FIG. 4) determines a masking type based on the user preference. For example, the type of masking may be associated with a prior history of the user interacting with news articles. For example, when a score is displayed, the user never views the article. While on the other hand, when a player name or a record is displayed, the user may view the article. Control circuitry 404 may retrieve the historical data from the subject matter database in storage 408. Historical data may include pop-up notifications on display 412, calendar events in the user profile, or an accessible user input interface 410 that lists all media assets associated with a particular subject matter. For example, control circuitry 404 may generate an overlay on display 412 informing the user that a supplemental media asset has been detected or may be displayed in a timeline. Control circuitry 404 may also retrieve a user profile of the user that includes the user's viewing history and calendar.

At step 908, control circuitry 404 (FIG. 4) masks, using the identified masking option, the identified portion of the heading in the supplemental media asset. Control circuitry 404 may retrieve, from the subject matter database in storage 408, a masking type (e.g., remove player names, remove team names, remove scores, remove adverbs) associated with a sports report.

At step 910, control circuitry 404 (FIG. 4) generates a media asset timeline of hyperlinks by combining the media asset and the supplemental media asset. For example, control circuitry 404 may link the media asset and supplemental media assets with the media asset timeline and may receive a user request to access the media asset upon clicking the respective hyperlink (e.g., via I/O path 402). The media playlist may feature a merged media asset of the media asset and supplemental media. The media timeline may also keep the media asset separate, but in an order based on release time.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 9.

Figure 10:
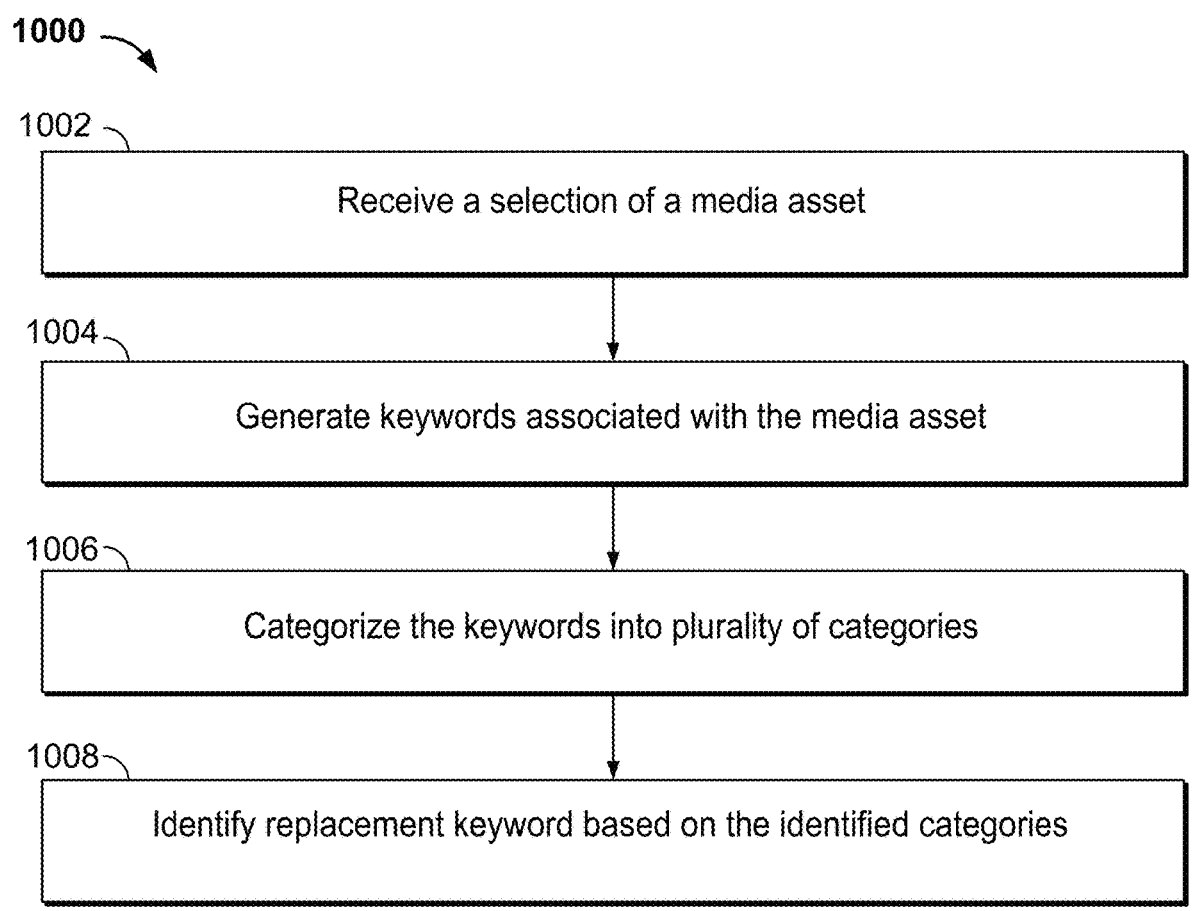
FIG. 10 is a flowchart of a detailed illustrative process for identifying supplemental media assets based on categorized keywords, in accordance with some embodiments of the disclosure.

FIG. 10 is a flowchart of a detailed illustrative process for identifying supplemental media assets based on categorized keywords, in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5)) in order to identify to mask portions of the media asset. In addition, one or more steps of process 1000 may be incorporated into or combined with one or more steps of any other process or embodiment (e.g., as described in relation to FIGS. 1-3 and 6-9 and 11).

At step 1002, control circuitry 404 (FIG. 4) receives a selection, input from a user, of a media asset, similarly to the details of selection as discussed in more detail above at step 702. In some embodiments, the selection is a tagging of a news story of interest. Control circuitry 404 may receive a selection associated with the media asset (e.g., news story) via I/O path 402.

At step 1004, control circuitry 404 (FIG. 4) generates keywords associated with the media asset (e.g., the news story). Control circuitry 404 (FIG. 4) may generate keywords by retrieving, from the media guidance data source 518 (FIG. 5), metadata associated with the media asset. Control circuitry 404 may extract text including headings, summaries, and content from the media asset. Control circuitry 404 may also utilize natural language processing and speech recognition to determine text from audio associated with the media asset.

At step 1006, control circuitry 404 (FIG. 4) categorizes the keywords into a plurality of categories. For example, control circuitry 404 may categorize the keywords using data analytics processing (e.g., clustering, classification), to determine a plurality of categories. The plurality of categories represents recurring themes or concepts. In some embodiments, control circuitry 404 may transcribe the news report and analyze all words to generate the plurality of categories. Suppose that one of the categories in the plurality of categories is "Russell Wilson." Keywords such as "touchdowns," "interception," "quarterback," and "captain" may be categorized under "Russell Wilson" because the data analytics process, clustering, may associate the keywords with "Russell Wilson" (e.g., since "touchdowns," "interception," "quarterback," and "captain" may be mentioned frequently alongside "Russell Wilson" in a sports news report).

At step 1008, control circuitry 404 (FIG. 4) identifies replacement keywords based on the identified categories. For example, the control circuitry 404 determines that a category associated with each of the first plurality of keywords corresponds to the aspect of subject matter. For example, the keywords categorized under a first category in the plurality of categories "Week 4 review" may include "score," "number of touchdowns," "injuries," and "outcome." In another example, the keywords categorized may be an adverb (e.g., convincingly) as part of describing the sports news story. The adverb may lead to identifying other scenarios where a similar outcome occurred. Because the category is associated with the first aspect of subject matter "football game," which corresponds to the first option, control circuitry 404 may identify the keywords associated with the first category as the first plurality of keywords. In some embodiments, control circuitry performs a search of the plurality of content sources (518) for media assets that include more than a threshold of the plurality of keywords associated with the media asset.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 10.

Figure 11:
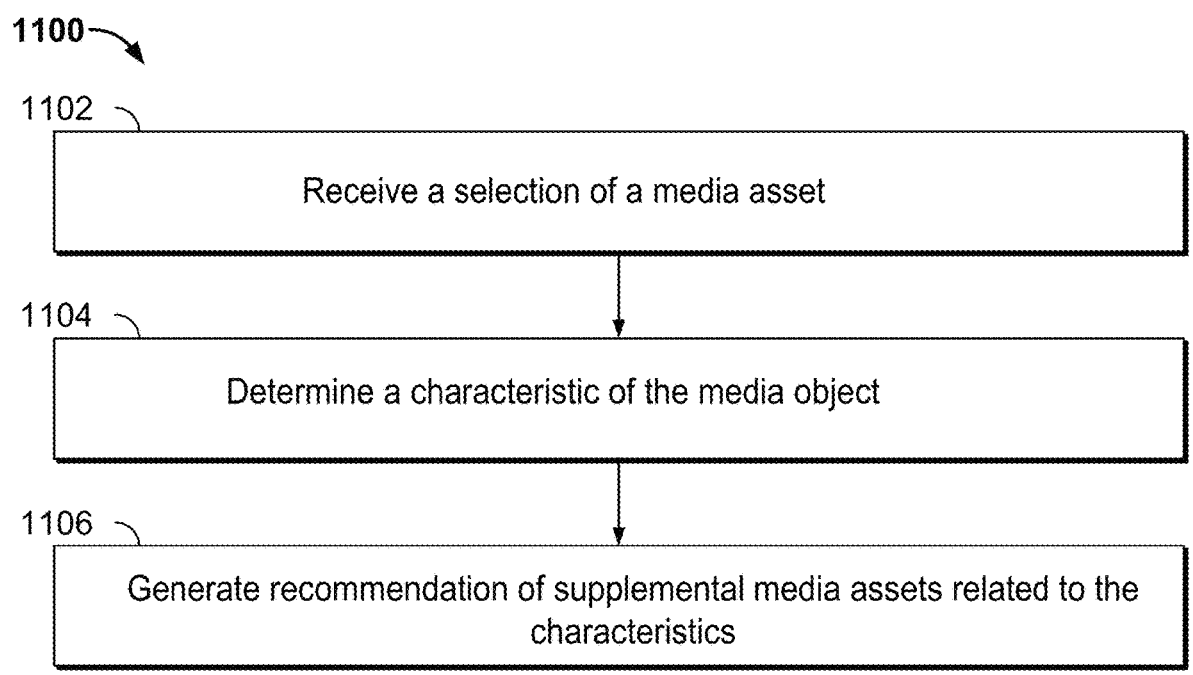
FIG. 11 is a flowchart of a detailed illustrative process for generating a recommendation of a supplemental media asset associated with a keyword of the media asset, in accordance with some embodiments of the disclosure.

FIG. 11 is a flowchart of a detailed illustrative process for generating a recommendation of a supplemental media asset associated with a keyword of the media asset, in accordance with some embodiments of the disclosure. It should be noted that process 1100 or any step thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5)) in order to generate a dynamic timeline for selection of media content. In addition, one or more steps of process 1100 may be incorporated into or combined with one or more steps of any other process or embodiment (e.g., as described in relation to FIGS. 1-3 and 6-10).

At step 1102, control circuitry 404 (FIG. 4) receives, at the client-based server, a user selection of a media asset. Continuing from the previous example, suppose that the user is viewing a news report on ESPN about a sports team in Seattle. Control circuitry 404 may allow the user to tag (i.e., select) the story, or specific headline or segment of a heading through a user input interface 410 on display 412. Based on his/her interest, the user may end up tagging the story or specific headline or segment of a heading. Control circuitry 404 may receive a selection associated with the media asset (e.g., news story) via I/O path 402.

At step 1104, control circuitry 404 (FIG. 4) determines a characteristic of the media asset. For example, control circuitry 404 may extract metadata from the media asset, or retrieve the metadata from the media guidance data source 518 (FIG. 5). The metadata may include information about the media asset, features, or characteristics from the heading, such as time of transmission, title, media type, description, content provider, and genre. Control circuitry 404 may choose one of these information types and identify the information type as a characteristic. In some embodiments, the control circuitry 404 may choose one of these information types and identify the information type as a feature for enhancement. For example, the media asset may be a news update about a sports team. Therefore, control circuitry 404 may retrieve the genre and description from the metadata (e.g., sports news about Seattle Seahawks) and determine a characteristic of the media such as "sports news," "Seattle Seahawks," "Russell Wilson," or "Week 4 update."

At step 1106, control circuitry 404 (FIG. 4) generates a recommendation of supplemental media assets related to the characteristic. Suppose that the characteristic determined by control circuitry 404 is the description "Seattle Seahawks." Control circuitry 404 may monitor the media content source 516 (FIG. 5) for content associated with the "Seattle Seahawks" or any other identified features by analyzing the metadata associated with any detected media asset for descriptions mentioning "Seattle Seahawks," or any other identified features. Thus, if the user selected a media asset about a sports news story involving the Seattle Seahawks, control circuitry 404 may recommend prior mentions of the stories featuring the Seattle Seahawks or similar features.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 11.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

Computer-readable media includes both non-transitory computer storage media and communication media, including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method for generating a dynamic timeline for selection of media content, the method comprising:
   receiving, from a user device, a selection of a media asset for display on the user device;
   retrieving metadata associated with the media asset, the metadata comprising one or more identifier tags of segments of the media asset and a date of the media asset;
   identifying a plurality of supplemental media assets depicting events related to the media asset each supplemental media asset of the plurality of supplemental media assets comprising one or more identifier tags and a date of the supplemental media asset; and
   generating for presentation on the user device the media asset and an interactive timeline, the interactive timeline comprising a plurality of selectable links, with each selectable link associated with a supplemental media asset of the plurality of supplemental media assets, wherein the plurality of selectable links are organized based on the dates of the supplemental media assets, and wherein the interactive timeline presents a sequence of the events related to the media asset.

2. The method of claim 1, further comprising:
   detecting at least one or more terms in a headline of the media asset, wherein the one or more terms are designated for enhancement; and
   masking the one or more terms in the headline of the media asset, wherein the masking the one or more terms generates an enhanced headline of the media asset.

3. The method of claim 2, further comprising:
   detecting at least one or more terms in a headline of the plurality of supplemental media assets; and
   masking the one or more terms in the headline of the plurality of supplemental media assets, wherein the masking the one or more terms generates an enhanced headline in the plurality of supplemental media assets.

4. The method of claim 1, wherein the interactive timeline of the plurality of selectable links is scrollable.

5. The method of claim 1, further comprising:
   receiving a selection of a selectable link of the plurality of selectable links from the interactive timeline; and
   retrieving the supplemental media asset of the plurality of supplemental media assets for presentation on the user device.

6. The method of claim 5, wherein the selectable link is an automatic hyperlink to the supplemental media asset of the plurality of supplemental media assets.

7. The method of claim 2, wherein the detecting at least one or more terms in the headline of the media asset comprises:
   extracting one or more descriptors from the headline;
   calculating an efficacy value for the one or more descriptors based on historical behavior data of a user profile associated with the user device; and
   based on the efficacy value of the one or more descriptors being below a threshold, updating the headline with one or more reconstruction descriptors.

8. The method of claim 1, wherein the media asset is a published media asset.

9. The method of claim 1, further comprising:
   receiving a search input;
   in response to receiving the search input, generating a search result identifying a plurality of media assets, the search result comprising a plurality of selectable links, each selectable link of the plurality of selectable links being associated with a media asset of the plurality of media assets;
   receiving a selection of a selectable link of the plurality of selectable links for presentation on the user device; and
   in response to receiving the selection of the selectable link, generating for display the media asset associated with the selectable link and the interactive timeline of selectable links to each supplemental media asset.

10. The method of claim 1, wherein the interactive timeline of selectable links comprises:
    a layered interactive timeline, wherein the layered interactive timeline comprises:
       a first layer of a first plurality of supplemental media assets configured for a first identifier tag, and
       a second layer of a second plurality of supplemental media assets configured for a second identifier tag.

11. A system for generating a dynamic timeline for selection of media content, the system comprising:
    memory; and
    control circuitry configured to:
       receive, from a user device, a selection of a media asset for display on the user device;
       retrieve metadata associated with the media asset, the metadata comprises one or more identifier tags of segments of the media asset and a date of the media asset;
       identify a plurality of supplemental media assets depicting events related to the media asset, each supplemental media asset of the plurality of supplemental media assets comprises one or more identifier tags and a date of the supplemental media asset; and
       generate for presentation on the user device, the media asset and an interactive timeline, the interactive timeline comprises a plurality of selectable links, with each selectable link associated with a supplemental media asset of the plurality of supplemental media assets, wherein the plurality of selectable links are organized based on the dates of the supplemental media assets, and wherein the interactive timeline presents a sequence of the events related to the media asset.

12. The system of claim 11, wherein the control circuitry is configured to:
    detect at least one or more terms in a headline of the media asset, wherein the one or more terms are designated for enhancement; and mask the one or more terms in the headline of the media asset, wherein the masking the one or more terms generates an enhanced headline of the media asset.

13. The system of claim 12, wherein the control circuitry is configured to:
   detect at least one or more terms in a headline of the plurality of supplemental media assets; and
   mask the one or more terms in the headline of the plurality of supplemental media assets, wherein the masking the one or more terms generates an enhanced headline in the plurality of supplemental media assets.

14. The system of claim 11, wherein the interactive timeline of the plurality of selectable links is scrollable.

15. The system of claim 11, wherein the control circuitry is configured to
   receive a selection of a selectable link of the plurality of selectable links from the interactive timeline; and
   retrieve the supplemental media asset of the plurality of supplemental media assets for presentation on the user device.

16. The system of claim 15, wherein the selectable link is an automatic hyperlink to the supplemental media asset of the plurality of supplemental media assets.

17. The system of claim 12, wherein the control circuitry is configured to detect at least one or more terms in the headline of the media asset by:
   extracting one or more descriptors from the headline;
   calculating an efficacy value for the one or more descriptors based on historical behavior data of a user profile associated with the user device; and
   based on the efficacy value of the one or more descriptors being below a threshold, updating the headline with one or more reconstruction descriptors.

18. The system of claim 11, wherein the media asset is a published media asset.

19. The system of claim 11, wherein the control circuitry is further configured to:
   receive a search input;
   in response to receiving the search input, generate a search result identifying a plurality of media assets, the search result comprising a plurality of selectable links, each selectable link of the plurality of selectable links being associated with a media asset of the plurality of media assets;
   receive a selection of a selectable link of the plurality of selectable links for presentation on the user device; and
   in response to receiving the selection of the selectable link, generate for display the media asset associated with the selectable link and the interactive timeline of selectable links to each supplemental media asset.

20. The system of claim 11, wherein the interactive timeline of selectable links comprises:
   a layered interactive timeline, wherein the layered interactive timeline comprises:
      a first layer of a first plurality of supplemental media assets configured for a first identifier tag, and
      a second layer of a second plurality of supplemental media assets configured for a second identifier tag.

* * * * *